United States Patent [19]

Tohma et al.

[11] Patent Number: 4,743,920

[45] Date of Patent: May 10, 1988

[54] THERMAL TRANSFER RECORDING METHOD AND APPARATUS

[75] Inventors: Koichi Tohma, Kawasaki; Naoki Kushida; Yasuyuki Tamura, both of Yokohama; Tetsuo Hasegawa, Tokyo; Hisao Yaegashi, Yokohama, all of Japan

[73] Assignee: Canon Kabushiki Kaisha, Tokyo, Japan

[21] Appl. No.: 887,914

[22] Filed: Jul. 22, 1986

[30] Foreign Application Priority Data

Jul. 31, 1985 [JP] Japan ............................... 60-168788
Dec. 25, 1985 [JP] Japan ............................... 60-295311

[51] Int. Cl.4 .......................... G01D 15/10; B41J 3/20

[52] U.S. Cl. ................................ 346/71; 346/76 PH; 400/120; 400/241.1; 400/198; 400/662

[58] Field of Search .......................... 346/1.1, 76 PH; 400/120, 241.1, 198, 662; 428/913, 945; 430/176, 348

[56] References Cited

U.S. PATENT DOCUMENTS

| | | | |
|---|---|---|---|
| 4,453,839 | 6/1984 | Findlay et al. | 400/120 |
| 4,462,035 | 7/1984 | Koto | 346/76 PH |
| 4,514,744 | 4/1985 | Saitoh et al. | 346/153.1 |
| 4,527,171 | 7/1985 | Takanashi et al. | 346/76 PH |
| 4,549,824 | 10/1985 | Sachdev et al. | 400/241.1 |
| 4,561,789 | 12/1985 | Saito | 400/120 |
| 4,580,142 | 4/1986 | Matsushita et al. | 346/1.1 |

FOREIGN PATENT DOCUMENTS

| | | |
|---|---|---|
| 54-161946 | 10/1979 | Japan . |
| 56-28873 | 2/1981 | Japan . |
| 56-63477 | 4/1981 | Japan . |
| 57-151375 | 1/1982 | Japan . |
| 58-12790 | 1/1983 | Japan . |
| 58-78782 | 4/1983 | Japan . |
| 58-219092 | 12/1983 | Japan . |
| 58-220795 | 12/1983 | Japan . |
| 59-33186 | 2/1984 | Japan . |
| 59-199290 | 2/1984 | Japan . |
| 60-64896 | 4/1985 | Japan . |
| 60-64898 | 4/1985 | Japan . |
| 479405 | 10/1969 | Switzerland . |
| 2142583 | 1/1985 | United Kingdom . |

*Primary Examiner*—Clifford C. Shaw
*Assistant Examiner*—Gerald E. Preston
*Attorney, Agent, or Firm*—Fitzpatrick, Cella, Harper & Scinto

[57] ABSTRACT

Thermal transfer recording is carried out through the steps of: applying a heat or electric energy in a pattern to a peripheral surface of an ink roll having the peripheral surface composed of a heat-transferable ink, thereby to form a melted or softened pattern of the heat-transferable ink; causing the peripheral surface of the ink roll to contact a recording medium to transfer the melted or softened ink pattern onto the recording medium; and smoothing the peripheral surface of the ink roll.

17 Claims, 2 Drawing Sheets

THERMAL TRANSFER RECORDING METHOD AND APPARATUS

FIELD OF THE INVENTION AND RELATED ART

The present invention relates to a thermal transfer recording method wherein recording cost has been lowered by removing the necessity of a conventionally used thermal transfer material.

A thermal or heat-sensitive transfer recording method has advantageous features in that recording on plain paper is possible, and the apparatus therefor is light in weight and generates little noise. For these reasons, thermal transfer recording has been widely used in recent years.

Thermal transfer recording method employs a thermal transfer material, comprising generally a heat transferable ink containing a colorant dispersed in a heat-fusible binder applied on a support generally in the form of a sheet. The thermal transfer material is superposed on the recording medium so that the heat-transferable ink layer may contact the recording medium. The ink layer is melted by supplying heat from an external heat generating member such as a thermal head or by applying a voltage to an electroconductive support or ink layer to generate Joule heat in the electroconductive support or in the ink layer per se (Japanese Laid-Open Patent Application Nos. 220795/1983 and 12790/1983, etc.), and the melted ink pattern is transferred to a recording medium, thereby to form a transferred ink image corresponding to the pattern of the heat on the recording medium.

The conventional thermal transfer recording method, however, uses a thermal transfer material obtained by forming a heat-transferable ink layer on a relatively expensive heat-resistant plastic film through complicated steps, and the thermal transfer material is essentially disposed of after a single use, so that the cost of thermal transfer recording is increased. Further, as a pattern of heat is supplied to the heat-transferable ink layer of the thermal transfter material through its support, a part of the heat energy is lost ineffectively.

In order to lower the recording cost by the thermal transfer recording method, it may be conceived of using a support in the form of an endless belt or a drum capable of repeated use and forming thereon a heat-transferable ink layer in situ by application of the ink, which ink layer is used as such in thermal transfer recording. In this case, however, it is necessary to incorporate an ink application means in a thermal transfer apparatus, so that the apparatus becomes complicated and large in size, and, in addition, energy for melt-applying the ink is required.

SUMMARY OF THE INVENTION

A principal object of the present invention is is to remove the above mentioned problems of the conventional thermal transfer recording method and to provide a thermal transfer recording method which can retain various thermal transfer performances and can effect a recording at a low cost with effective utilization of heat energy while using a compact apparatus.

As a result of our study with the above object in view, it has been found very effective for accomplishing the above objects to form a heat-transferable ink per se in the form of a roll, apply a heat or a voltage directly to the peripheral surface of the roll to form a viscous ink pattern and press the heat-transferable ink roll onto a recording medium while the viscous ink pattern is retained, to effect a transfer recording. Thus, a cost for thermal transfer recording can be lowered because a compact thermal transfer apparatus can be used, a conventionally used expensive thermal transfer material is unnecessary, a loss of heat attributable to heat supply in a pattern through a support as used conventionally can be obviated.

The thermal transfer material according to the present invention is based on the above knowledge and more specifically comprises the steps of: applying a heat or electric energy in a pattern to a peripheral surface of an ink roll having the peripheral surface composed of a heat-transferable ink, thereby to form a melted or softened pattern of the heat-transferable ink; causing the peripheral surface of the ink roll to contact a recording medium to transfer the melted or softened ink pattern onto the recording medium; and smoothing the peripheral surface of the ink roll.

These and other objects, features and advantages of the present invention will become more apparent upon a consideration of the following description of the preferred embodiments of the present invention taken in conjunction with the accompanying drawings, wherein like parts are denoted by like reference numerals. In the description hereinafter, "%" and "parts" representing quantity ratios are by weight unless otherwise noted specifically.

DETAILED DESCRIPTION OF THE INVENTION

Figure 1:
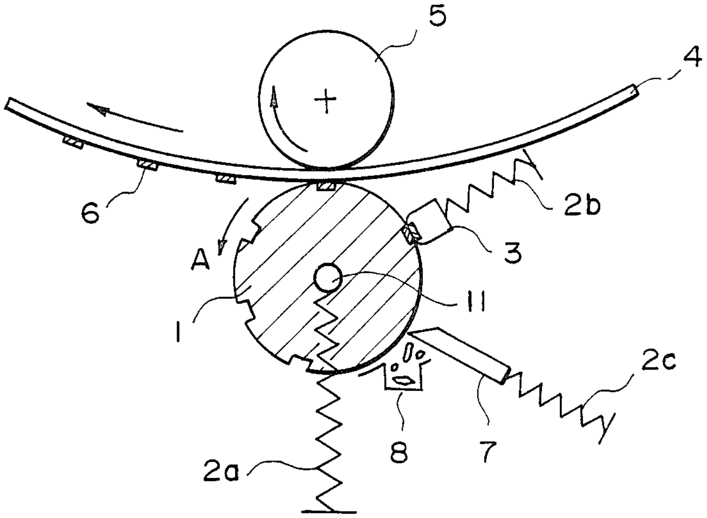
FIGS. 1–3 are respectively a schematic side view partially in section illustrating an embodiment of apparatus for practicing the thermal transfer recording method according to the present invention.

FIG. 1 is a sectional view of an apparatus for practicing an embodiment of the present invention taken in the thickness direction of a recording medium, wherein a mode of supplying a heat for melting or softening a heat-transferable ink from a thermal head (hereinafter referred to as a "thermal head mode") is adopted.

Referring to FIG. 1, an ink roll 1 having a peripheral surface composed of a heat-transferable ink is disposed with its center 11 held by a spring 2*a* so as to rotate continuously or intermittently in the direction of an arrow A.

On the other hand, a thermal head 3 is disposed at a point near the peripheral surface of the rotating ink roll 1 so as to be capable of contacting the peripheral surface by the action of a spring 2*b*. When a heat in desired transfer pattern is supplied to the heat-transferable ink constituting the peripheral surface, the ink thermally melts or softens to acquire a viscosity corresponding to the heat pattern and a transferability onto a recording medium. The viscous ink pattern moves upwardly in the figure following the rotation of the ink roll 1.

While the viscous pattern of the heat-transferable ink is retained corresponding to the above mentioned heat supply pattern, the peripheral surface of the ink roll 1 contacts a recording medium 4 moving leftward in the figure at a prescribed transfer position. At this position, a pressure is applied by means of a pressing member such as a pressure roller 5 disposed opposite to the ink roll 1 by the medium of the recording medium 4, and under the action of the pressure, the viscous transferable ink pattern is transferred onto the recording medium 4 to leave a transfer-recorded image 6.

After the above mentioned transfer step, the ink roll 1 further rotates from the transfer position in the direction of the arrow A, and the roughened peripheral surface is smoothed by a blade 7 disposed upstream of the thermal head 3 and connected to a spring 2C, so that the scraped ink is collected in an ink bin 8.

Now, the respective members or parts shown in the figure will be explained.

The ink roll 1 has a shape of a rotational body such as a cylinder and a truncated cone with at least its peripheral surface composed of a heat-transferable ink. As far as it is rotatable about the central axis 11 and capable of receiving a necessary pressure from the spring 2a connected to the axis 11, substantially the whole body of the ink roll 11 may be composed of a heat-transferable ink formed into a rotational body, or the ink roll 1 may be comprised by forming a coating layer of the heat-transferable ink about a core made of a metal, a resin, etc.

It is necessary that the ink pattern melted or softened by heat application from the thermal head 3 retain its transferability until it contacts the recording medium 4 at the transfer position. For this purpose, it is possible to use an ordinary heat-transferable ink for constituting the periphery of the ink roll 1 by minimizing the distance between the position for contacting the thermal head 3 and the transfer position for contacting the recording medium 4, so that the viscous pattern after heat application is retained. In the present invention, however, it is preferred to use a heat-transferable ink having a supercooling characteristic (hereinafter referred to as a "supercoolable heat-transferable ink") for constituting the peripheral surface of the ink roll 1.

Herein, the supercoolable heat-transferable ink is defined as an ink which can, when cooled after having been heated into a melted or softened state, retain the melted or softened viscous state capable of transfer onto a recording medium for a certain period under a temperature below its primary melting or softening point.

The supercoolable heat-transferable ink may be formulated by dispersing a colorant such as a dye or pigment in a heat-fusible binder having a supercooling characteristic (hereinafter referred to as a "supercoolable heat-fusible binder"). Herein, the supercoolable heat-fusible binder is a binder which can, when cooled after having been heated into a melted state, retain the melted state for a certain period under a temperature its original melting point. Some supercoolable heat-fusible binders have already been known. Incidentally, for a binder not showing a definite melting point, the above definition of the supercoolable heat-fusible binder holds true by replacing the melting point by the softening point as measured by the ring and ball method and the melted state by the softened state.

Such supercoolable heat-fusible binders may be obtained by mixing one or two or more species of known supercoolable substances including plasticizers such as N-cyclohexyl-p-toluenesulfonamide, N-ethyl-p-toluenesulfonamide, benzotriazole, acetanilide, and derivatives of these substances, within a conventional heat-fusible binder used in a conventional heat-transferable ink, e.g., a thermoplastic resin such as a polyamide resin, an acrylic resin, polyvinyl acetate resin or a copolymer of these, having a softening point by the ring and ball method of preferably 40°-230° C., more preferably 50°-200° C., or natural or synthetic wax of various species.

A supercoolable heat-fusible binder to be used in the present invention may be obtained by mixing 20 to 90 parts of a supercoolable substance as described above with 10 to 80 parts of a conventional heat-fusible binder as described above.

Further, an amide resin having a supercooling characteristic may suitably be used as a supercoolable heat-fusible binder. In this case, the supercooling characteristic of the resultant supercoolable heat-fusible binder originates from the property of the amide resin per se.

When such a supercoolable amide resin is used as the supercoolable heat-fusible binder, the supercooling time, i.e., the viscosity retaining time, can be appropriately adjusted, so that effective recording may be effected.

The amide resin having a supercooling characteristic to be used in the present invention may be one or two or more of those represented by the general formula (I):

$$R_1-\underset{\underset{O}{\|}}{C}-\underset{H}{N}-R_2-\underset{H}{N}-\underset{\underset{O}{\|}}{C}-R_1. \qquad (I)$$

In the above formula, $R_1$ may be a hydrocarbon group such as a saturated aliphatic group, an unsaturated aliphatic group, an aromatic group, or a group having an aromatic group in its carbon chain, among which a saturated aliphatic hydrocarbon group is particularly preferred. The number of carbon atoms in the group $R_1$ may be 1-30, preferably 10-20. The two $R_1$ groups apparing at both ends of the above formula (I) may be the same or different hydrocarbon groups. $R_2$ is a divalent hydrocarbon group which may preferably be one having two bonds connected to different carbon atoms therein but may be one having two bonds connected to a single carbon atom therein. The group $R_2$ may for example be a saturated aliphatic group, an unsaturated aliphatic group, phenylene group or a group having an aromatic ring in its carbon chain, among which an aliphatic saturated group or phenylene group is particularly preferred. The number of carbon atoms in the group $R_2$ may be 1-12, preferably 5-10.

The supercoolable amide resin represented by the above formula (I) may preferably be used in a proportion of 50% or more of the whole heat-transferable ink constituting the ink roll in view of a supercooling time of the resultant ink (a period of time in which the ink once heated above the melting or softening point into a melted or softened state starts to solidify when left to stand at room temperature). When the content of the amide resin represented by the above formula (I) is too small, sufficient effect is not attained. It is possible that the whole binder constituting the transferable ink roll is composed of one or two or more species of the amide resin represented by the above formula (I).

The supercoolable amide resin of the formula may be produced through the following reaction scheme:

$$R_1\underset{\underset{O}{\|}}{C}OH + H_2NR_2NH_2 \longrightarrow R_1\underset{\underset{O}{\|}}{C}-\underset{H}{N}-R_2-\underset{H}{N}-\underset{\underset{O}{\|}}{C}R_1$$

Examples of the diamine ($H_2NR_2NH_2$) used in the above reaction include aliphatic diamines such as methylenediamine, ethylenediamine and propylenediamine, and phenylenediamine.

Examples of the monocarboxylic acid ($R_1CO_2H$) used in the above reaction include stearic acid and lauric acid.

The supercoolable amide resin may be synthesized by mixing one or more species each of the above mentioned diamine and monocarboxylic acid and subjecting them to condensation under heating. Further the amide resin used in the present invention can be in the form of a mixture of two or more species of the amide resin.

The melt viscosity and the adhesiveness of the supercoolable heat-transferable ink may be adjusted by adding an oil agent to the supercoolable heat-fusible binder to regulate the supercooling characteristic, and/or by adding an elastomer, etc., thereto.

The colorant constituting the supercoolable heat-transferable ink in combination with the above mentioned supercoolable heat-fusible binder may be any of the known dyes and pigments such as carbon black used in the field of printing and other recording methods. These dyes or pigments may be used singly or in mixture of two or more species. The colorant may preferably be contained in the ink in a proportion of 1–40%.

The supercoolable heat-transferable ink comprising the supercoolable heat-fusible binder, the colorant and other additives may preferably be composed so as to have a melting point or a softening point of 40°-200° C., particularly 50°-180° C., and supercooling time of 0.1 sec.-100 min., particularly 0.1 sec.-50 min. If the ink has a melting or softening point is below 40° C., the storability of the ink roll 1 is lowered and the non-image part on the recording medium is also stained. On the other hand, if the melting or softening point is above 200° C., much energy is required for the melting or softening of the ink.

Further, if the supercooling time is too short, it becomes difficult to retain the melting or softening state of the ink after the heat application step up to the step of transfer to the recording medium. On the other hand, if the supercooling time is too long, the stability of the recording image immediately after the transfer onto the recording medium is lost. For these reasons, for a practical use, the supercooling time may be preferably 0.1–100 sec., particularly 0.1–50 sec., most preferably 0.1–10 sec.

The supercooling time may be adjusted by appropriately selecting the supercoolable heat-fusible binder to be used or mixing a plurality of binders, or alternatively when a supercoolable amide resin, by appropriately selecting the species and the mixing ratio of the monocarboxylic acid and diamine as starting materials or by mixing a plurality of the amide resins as represented by the general formula (I) as described above.

The ink roll 1 used in the present invention may be obtained, e.g., by melt-mixing a supercoolable heat-fusible binder as described above or an ordinary heat-fusible binder, a colorant and additives by means of a dispersion apparatus such as an attritor to prepare a heat-transferable ink and shaping together with an optional core member the heat-transferable ink into a desired shape of rotational body.

In order to avoid sticking of the melted or softened ink from the ink roll onto the thermal head 3, a release agent such as an aliphatic acid amide or a metallic soap, or particles of a filler such as a high-melting point wax or resin may be added into the ink roll 1.

Further, it is possible to use a plurality of ink rolls 1 for color recording.

The thermal head 3 is a member for supplying heat in a desired recording pattern to the peripheral surface of the ink roll 1 as described above.

For the thermal head 3, a conventional thermal head may be used, or alternatively it may be coated with, e.g., a silicone resin in order to avoid the sticking of melted or softened ink from the directly contacting ink roll 1.

In the heat application from the thermal head 3, the applied pressure may be 2 $\mu g/cm^2$ or below as far as the peripheral surface of the ink roll 1 and the thermal head may contact each other sufficient for heat application in a desired pattern, and the application pulse duration may suitably be 0.5 to 5 msec.

It is also possible to obtain a recording of an intermediate tone by changing the amount of heat supply to the thermal head 3 to change the amount of transfer of ink onto the recording medium 4.

The pressing roller 5 may be either an elastomeric roller surfaced with various rubbers or resins, or a rigid roller surfaced with a metal or a ceramic material.

The pressure applied to the recording medium 4 between the pressing roller 5 and the ink roll 1 may preferably be 0.5–10 kg/cm, particularly 1–5 kg/cm, in terms of a linear pressure. From the view point of sufficiently attaching the heat-transferable ink to concavities of a recording medium having a poor surface smoothness, it is preferred that the above pressure is large.

The distance between the transfer position where the pressing roller 5 is disposed opposite to the ink roll 1 and the position of the above mentioned thermal head 3 is so adjusted that the heat-transferable ink constituting the peripheral surface of the ink roll 1 may retain a melted or softened state in a desired pattern.

The blade 7 is a member for smoothing by scraping the peripheral surface of the ink roll 1 which has been roughened in the transfer step. The blade may be heated as desired. It is also possible to effect the smoothing by means of a member such as a heating roller for heating the peripheral surface to cause re-melting or -softening thereof as will be described hereinafter. Further, the smoothing means may be an irradiation means such as a flash light or an infrared radiation source.

The springs *2a*, *2b* and *2c* hold the ink roll 1, the thermal head 3 and the blade 7 so that the peripheral surface of the ink roll of which the diameter gradually decreases through the smoothing by the blade 7 will keep contact with the recording medium 4 and the other members as required for continuation of the thermal transfer recording.

In the above, an embodiment of a thermal head mode, i.e., wherein a thermal head is used as a heat source in the heat application step, has been explained whereas it would be readily understood the present invention can be equally practised even when another heat source such as a laser beam is used instead of the above described thermal head.

Figure 2:
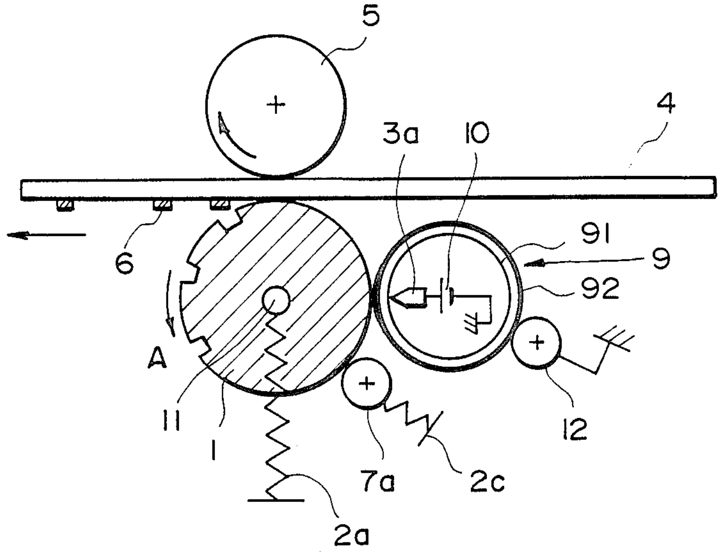

Further, in addition to the above, as in an embodiment shown in FIG. 2, a recording electrode *3a* of a single stylus electrode or multi stylus electrodes may be used instead of the thermal head 3 as a means for heat supply in a pattern in combination with an electroconductive drum 9.

Referring to FIG. 2, on a low resistance layer 91 (volume resistivity: 10–$10^4$ Ωcm) is disposed a metallic electroconductive layer 92 having a higher electroconductivity to provide an electroconductive drum 9, and the recording electrode 3*a* is disposed opposite to the ink roll 1 with the electroconductive drum 9 therebetween so as to contact the low resistance layer 91. The recording electrode 3*a* is connected to power supply 10 and via the low resistance layer 91 to the electroconductive layer 92 which is in turn connected to a return electrode 12.

In the apparatus arrangement shown in FIG. 2, the low resistance layer 91 directly contacting the recording electrode generates a Joule's heat in a pattern which is applied to the peripheral surface of the ink roll 1. In this case, the recording electrode 3*a* does not directly contact the ink roll 1, so that the electrode 3*a* is little stained and the surface of the metallic electroconductive layer 92 is readily cleaned. The other members and arrangement are the same as in the embodiment shown in FIG. 1 except that a heating roller 7*a* as described above is used in place of the blade 7.

Figure 3:
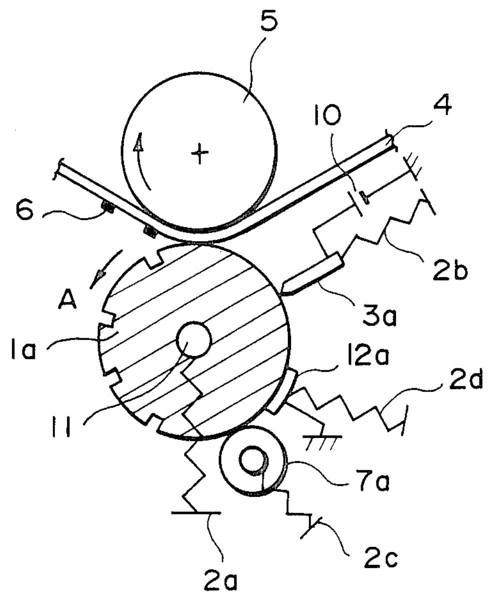

FIG. 3 shows another embodiment of using a recording electrode 3*a*.

Referring to FIG. 3, there is disposed an ink roll 1*a* which has been made electroconductive by dispersing therein electroconductive particles (not shown), and the recording electrode 3*a* and a return electrode 12*a* of a large area are disposed. This embodiment is similar to the one shown in FIG. 2 except that the portion of the peripheral surface of the electroconductive ink roll 1*a* per se contacting the recording electrode 3*a* generates a Joule's heat to be melted or softened in a pattern.

As described hereinabove, according to the present invention, there is provided a thermal transfer recording method wherein a heat or electric energy is directly applied in a pattern to a smooth peripheral surface composed of a heat-transferable ink of an ink roll, and the ink melted or softened corresponding to the pattern is transferred to a recording medium under contact.

According to the recording method of the present invention, a compact thermal transfer apparatus may be used while avoiding the use of an expensive thermal transfer material which has been used conventionally. Further, a pattern heat is supplied to a heat-transferable ink directly (without the medium of a support). Accordingly, the recording cost can be remarkably lowered in respects of both material and energy. Furthermore, according to the present invention, a good quality of recorded images can be obtained even on a recording medium having poor surface smoothness, and recorded images of intermediate tone can also be obtained.

Hereinbelow, the present invention will be explained more specifically by way of specific examples.

EXAMPLE 1

A supercoolable heat-transferable ink was prepared based on the following prescription.

| | |
|---|---|
| Carbon black (Printex L, mfd. by Degussa, Inc.) | 5 parts |
| Polyamide resin (Sanmide #55, mfd. by Sanwa Kagaku K.K.) | 80 parts |
| N—ethyl-p-toluenesulfonamide | 15 parts |

The above components were subjected to dispersion-mixing under heating at 110° C. to prepare a supercoolable heat-transferable ink (melting point: 62° C., supercooling time: 10 sec.), which was then formed into a cylindrical shape having a 60 mm diameter and a 10 mm-diameter resinous core.

The thus prepared ink roll 1 was incorporated in a compact thermal transfer apparatus as shown in FIG. 1, wherein the distance between the position of the ink roll 1 contacting the thermal head 3 and the transfer position where the pressing roller 5 was disposed opposite to the ink roll 1 was set to 1 cm. Heat was directly applied to the peripheral surface of the ink roll 1 by means of a thermal head at a pulse duration of 1.1 msec. The resultant softened ink pattern of the supercoolable heat-transferable ink was transferred onto a high-smoothness recording paper (having a smoothness of 120 sec. according to an Ohken-type smoothness tester) under a linear pressure of 1 kg/cm to form recorded images.

The recorded images on the high-smoothness, recording paper were good in printed letter qualities such as density, transfer characteristic, and clearness by naked eye observation, and were obtained at a lower recording cost and with a lower energy consumption when compared with a conventional thermal transfer recording method using a thermal transfer material.

Then, the above recording operation was repeated onto a low-smoothness bond paper (having a smoothness of 3–4 sec. according to the Ohken-type smoothness tester) except that the pressure between the ink roll 1 and the pressing roller 5 was increased to 5 kg/cm in terms of a linear pressure, whereby recorded images were formed on the bond paper.

The recorded images on the bond paper were good in printed letter qualities such as density, transfer characteristic and clearness by naked eye observation, and the letter qualities were almost identical to those of the recorded images on the high smoothness recording paper as described above.

Further, the amount of transfer of the super-coolable heat-transferable ink was changed by changing the heat application pulses, so that recorded images of intermediate tones could be obtained on the above mentioned high-smoothness recording paper and the bond paper.

EXAMPLE 2

Amide resins A–C were synthesized according to the prescriptions shown in the following Table 1.

TABLE 1

| | (numbers indicate mol ratios) | A | B | C |
|---|---|---|---|---|
| Monocarboxylic acid ($R_1CO_2H$) | Stearic acid | 10 | 0 | 10 |
| | Lauric acid | 0 | 10 | 0 |
| Diamine ($H_2NR_2NH_2$) | Ethylenediamine | 5 | 5 | 0 |
| | Hexamethylene-diamine | 0 | 0 | 5 |

The synthesis was effected in the following manner. Thus, a monocarboxylic acid and a diamine as shown in Table 1 were charged in a 4-necked round-bottomed flask provided with a thermometer, a mechanical stirrer, a water removal tube and a nitrogen-flowing tube. The content was held at 180° C. for 5 hours and then subjected to a reduced pressure of 100 mmHg for 1.5 hours to synthesize amide resins A, B and C. The softening points of the amide resins A, B and C are shown in Table 2 appearing hereinafter.

Then, each amide resin in an amount of 100 parts was mixed with 10 parts of nigrosine dye for dispersion at 110° C. The thus prepared heat-transferable inks were respectively formed into a cylinder of 60 mm-diameter with a resinous core of 10 mm-diameter to form an ink roll 1.

Each ink roll 1 was incorporated in a compact thermal transfer apparatus as shown in FIG. 1, wherein the distance between the position of the ink roll 1 contacting the thermal head 3 and the transfer position where the pressing roller 5 was disposed opposite to the ink roll 1 was set to 1.5 cm. Heat was directly applied to the peripheral surface of the ink roll 1 by means of a thermal head. The resultant softened ink pattern of the supercoolable heat-transferable ink was transferred onto a wood-free paper to form recorded images. The durations of heat pulses applied from the thermal head to ink rolls were changed depending on the amide resins constituting the ink rolls as shown in the following Table 2.

TABLE 2

| Amide resin | A | B | C |
|---|---|---|---|
| Softening temperature (°C.) | 80 | 70 | 90 |
| Pulse duration (m. sec) | 0.9 | 0.7 | 1.1 |

The thus recorded images were good in printed letter qualities such as density, transfer characteristic, and clearness by naked eye observation, and were obtained at a lower recording cost and with a lower energy consumption when compared with a conventional thermal transfer recording method using a thermal transfer material.

What is claimed is:

1. A thermal transfer recording method comprising the steps of:

applying heat or electric energy directly to a peripheral surface of an ink roll at a predetermined position thereof, said ink roll having a peripheral surface comprising a heat-transferable ink layer, thereby to form a melted or softened pattern of said heat-transferable ink;

causing the peripheral surface of said ink roll to contact a recording medium at a position spaced from the predetermined position to transfer the melted or softened ink pattern onto the recording medium; and smoothing the peripheral surface of said ink roll, wherein said layer of heat-transferable ink has a thickness allowing for application of heat or electric energy to form another melted or softened pattern after smoothing.

2. Thermal transfer recording method according to claim 1, wherein said heat-transferable ink has a supercooling time of 0.1–100 sec.

3. A thermal transfer recording method according to claim 1, wherein said heat-transferable ink has a supercooling time of 0.1–50 sec.

4. A thermal transfer recording method according to claim 1, wherein said heat-transferable ink has a supercooling time of 0.1 to 10 sec.

5. A thermal transfer recording method according to claim 1, wherein said heat-transferable ink has a melting or softening point of 40°–200° C.

6. A thermal transfer recording method according to claim 1, wherein said heat-transferable ink has a melting or softening point of 50°–180° C.

7. A thermal transfer recording method according to claim 1, wherein said heat-transferable ink comprises as a binder an amide resin represented by the following general formula:

$$R_1CONHR_2NHCOR_1,$$

wherein $R_1$ is a hydrocarbon group having 1–30 carbon atoms, and $R_2$ is a divalent hydrocarbon group having 1–12 carbon atoms.

8. A thermal transfer recording method according to claim 7, wherein the hydrocarbon group $R_1$ has 10–20 carbon atoms.

9. A thermal transfer recording method according to claim 7, wherein the hydrocarbon group $R_2$ has 5–10 carbon atoms.

10. A thermal transfer recording method according to claim 7, wherein the hydrocarbon group $R_2$ is a saturated aliphatic group.

11. A thermal transfer recording method according to claim 7, wherein the hydrocarbon group $R_2$ is a phenylene group.

12. A thermal transfer apparatus, comprising:

rotatable ink roll having a peripheral surface comprising a heat-transferable ink layer;

a pressing member disposed opposite to the peripheral surface of said ink roll;

heating means for selectively melting or softening the peripheral surface of said ink roll, said heating means being disposed upsteam of said pressing member relative to the direction of rotation of said ink roll; and smoothing means for smoothing the peripheral surface of said ink roll, wherein said layer of heat-transferable ink has a thickness allowing for another melting or softening thereof after smoothing.

13. A thermal transfer apparatus according to claim 12, wherein said heating means is a thermal head.

14. A thermal transfer apparatus according to claim 12, wherein said heating means comprises a laminate drum having an outer electroconductive layer and an inner resistance layer, and a recording electrode electrically contacting said inner resistance layer.

15. A thermal transfer apparatus according to claim 12, wherein said thermal head ink contains electroconductive particles and said heating means is a recording electrode contacting the peripheral surface of the ink roll.

16. A thermal transfer apparatus according to claim 12, wherein said smoothing means comprises a blade.

17. A thermal transfer apparatus according to claim 12, wherein said smoothing means comprises a heating roller.

* * * * *

UNITED STATES PATENT AND TRADEMARK OFFICE

CERTIFICATE OF CORRECTION

PATENT NO. : 4,743,920

DATED : May 10, 1988

INVENTOR(S) : KOICHI TOHMA, ET AL.

It is certified that error appears in the above-identified patent and that said Letters Patent is hereby corrected as shown below:

COLUMN 1

Line 17, "method" should be deleted.
Line 42, "transfter" should read --transfer--.

COLUMN 2

Line 54, "a heat in" should read --heat in a--.

COLUMN 3

Line 18, "ink roll 11" should read --ink roll 1--.
Line 20, "comprised" shoud read --composed--.
Line 50, "under a temperature its" should read --at a temperature below its--.

COLUMN 5

Line 30, "sec.-100 min., particularly 0.1 sec.-50 min." should read --sec.-100 sec., particularly 0.1 sec.-50 sec.--.
Line 31, "is" should be deleted.
Line 42, "recording" should read --recorded--.

COLUMN 8

Line 17, "high-smoothness," should read --high-smoothness--.
Line 37, "super-coolable" should read --supercoolable--.

UNITED STATES PATENT AND TRADEMARK OFFICE
CERTIFICATE OF CORRECTION

PATENT NO. : 4,743,920

DATED : May 10, 1988

INVENTOR(S) : KOICHI TOHMA, ET AL.

It is certified that error appears in the above-identified patent and that said Letters Patent is hereby corrected as shown below:

COLUMN 9

Line 51, "Thermal" should read --A thermal--.

COLUMN 10

Line 30, "rotatable" should read --a rotatable--.
Line 36, "upsteam" should read --upstream--.
Line 50, "thermal head ink" should read --heat-transferable ink--.

Signed and Sealed this

Twenty-first Day of March, 1989

*Attest:*

DONALD J. QUIGG

*Attesting Officer*

*Commissioner of Patents and Trademarks*